United States Patent [19]

Danter et al.

[11] Patent Number: 5,381,601
[45] Date of Patent: Jan. 17, 1995

[54] INSULATION STRIPPING APPARATUS

[75] Inventors: Laurence K. Danter, Newbury Park, Calif.; Armin Herzog; Manfred Wilmes, both of Detmold, Germany

[73] Assignee: Weidmüller Interface GmbH & Co., Germany

[21] Appl. No.: 138,075

[22] Filed: Oct. 20, 1993

[30] Foreign Application Priority Data

Oct. 21, 1992 [DE] Germany .................. 4235536

[51] Int. Cl.6 ............................................. H02G 1/12
[52] U.S. Cl. ........................................ 30/90.1; 30/92; 81/9.44
[58] Field of Search ............... 30/90.1, 90.6, 91.2, 30/92; 81/9.4, 9.44

[56] References Cited

U.S. PATENT DOCUMENTS

| | | | |
|---|---|---|---|
| 3,407,497 | 10/1968 | Ratay | 30/91.2 |
| 4,472,877 | 9/1984 | Undin et al. | 30/90.7 |
| 4,625,386 | 12/1986 | Bieganski | 30/90.1 |
| 4,829,671 | 5/1989 | Cheng | 30/90.1 |
| 4,945,636 | 8/1990 | Takijawa | 30/90.1 |
| 5,009,130 | 4/1991 | Bieganski | 81/9.4 |
| 5,150,522 | 9/1992 | Gwo-Jiang | 30/91.2 |

FOREIGN PATENT DOCUMENTS 0206376 6/1990 European Pat. Off. .
0397319 11/1990 European Pat. Off. .

Primary Examiner—Eugenia Jones
Assistant Examiner—Hwei-Siu Payer
Attorney, Agent, or Firm—Laubscher & Laubscher

[57] ABSTRACT

An insulation stripping apparatus is disclosed including a tool housing (1) containing a slitting channel (6) for laterally receiving an insulated conductor (7). A clamping or support body (10) connected with the tool housing carries at least one knife cassette (33) that is laterally adjustable longitudinally of the slitting channel in a corresponding cassette-receiving opening (26) contained in the clamping body between different cutting positions relative to the conductor. The thickness of the knife cassette is appreciably less than the length of the groove, whereby a plurality of knife cassettes may be mounted for simultaneous cutting of the insulation at desired cutting depths and at a plurality of longitudinally displaced positions, respectively.

13 Claims, 3 Drawing Sheets

5,381,601

INSULATION STRIPPING APPARATUS

STATEMENT OF THE INVENTION

An insulation stripping tool is disclosed including a tool housing containing a stripping channel for laterally receiving an insulated conductor, and means for adjustably supporting a knife cassette for lateral displacement between a plurality of insulating cutting positions longitudinally spaced of said stripping channel.

BRIEF DESCRIPTION OF THE PRIOR ART

Insulation stripping tools are well known in the patented prior art, as evidenced, for example, by the Undin et al U.S. Pat. No. 4,472,877. In the European patent No. 0206376B1, the insulation stripping device includes a tool body containing an insulation stripping channel, at least one knife cassette for positioning at least one insulation stripping knife adjacent the circumference of the stripping channel, as well as a plane lying normal to its longitudinal channel direction, and a clamping body that can be connected with the equipment unit body for the purpose of holding the knife cassette.

The insulation stripping device, for example, can be used for stripping the insulation from coaxial cables. For this purpose, it is necessary to cut through several concentric layers lying at different depths, such as, for example, insulating layers, screening layers, etc., at different locations spaced longitudinally of the cable. To this end, there are provided a plurality of insulation stripping knives arranged at corresponding intervals inside the knife cassette. If the coaxial cable is placed in the stripping channel, and if it is pressed against the insulation stripping knives by means of a clamping device, then the concentric layers of the coaxial cable can be cut through if the insulation stripping unit is then rotated around the coaxial cable. All of the insulation stripping knives are contained in only one single knife cassette, and the intervals between the insulation stripping knives are firmly predetermined. Therefore, if layers of a coaxial cable are to be cut through at different intervals, then a new knife cassette must be inserted in the insulation stripping device, and in that new cassette, the insulation stripping knives have the proper intervals from each other. With the aid of adjustment members provided inside the clamping body, one can displace the insulation stripping knives within the knife cassette toward or away from the axis of the stripping channel in order thus to be able to cut at different depths.

The insulation stripping tool described above can be used not only to strip the insulation off coaxial cables, but also off of other products having a circular cross section which include a plurality of concentric layers. Thus, for example, the slitting apparatus might be used in connection with hoses, coated rope, and the like.

The present invention was developed to provide an improved insulation stripping tool of the kind discussed above wherein one can be more flexible as regards the arrangement of the insulation stripping knives within the stripping tool body. The provision on the clamping body of adjustment means for varying the depth of the knife cuts is avoided, thereby affording simplified adjustment of the knife positions both longitudinally and in the cutting depth directions relative to the axis of the slitting channel.

SUMMARY OF THE INVENTION

Accordingly, a primary object of the present invention is to provide an improved insulation stripping tool wherein a knife cassette is supported for adjustment in a clamping or support body between a plurality of insulation-stripping positions longitudinally spaced along the axis of the stripping channel contained in a side wall of the tool housing to which the clamping body is connected.

According to a more specific object, the clamping body contains a knife-cassette-receiving groove, and the knife cassette has a thickness that is appreciably smaller than the length of the stripping channel, retaining means being provided in the groove for holding the knife cassette at different positions along the longitudinal axis of the stripping channel.

Another object of the invention is to provide a knife-cassette-supporting body in which there may be arranged in different positions in the receiving groove one or several knife cassettes whose width amounts to only a fraction of the length of the groove, whereby a plurality of position combinations can be implemented with only a relatively small number of knife cassettes. In this case, each of the insulation stripping knives is contained in its own knife cassette, respectively.

According to a further object, in order to adjust the angular cutting depth position of the particular insulation stripping knives relative to the cassette in the direction toward the stripping channel, there are provided corresponding adjustment means that are directly integrated into the knife cassette, whereby insulation stripping knives with different angular positions can be inserted successively in the clamping body at one and the same spot without the need for any adjustment means on the clamping body itself. This quite considerably simplifies the preparation of an insulation stripping process because now one needs only to select and insert knife cassettes in which the insulation stripping knives are already preset as regards their angularly pivoted position. For this purpose, the knife cassettes can be marked accordingly.

According to one very advantageous embodiment of the invention, the retaining means for retaining the knife cassette at a desired position within the clamping or support body includes a series of ribs that define grooves on opposite sides of the cassette-receiving opening for receiving corresponding guide tabs at opposite edges of the knife cassettes. In this way, one can make sure that the position grid for the arrangement of the knife cassettes in the longitudinal direction of the treatment channel will be very precise so that desired insulation stripping positions can be accurately determined.

Preferably, the knife cassette receiving opening in the clamping body is in communication with the stripping channel, so that by virtue of the rearward wall area against which the knife cassettes are displaced, a stop may be provided for positioning the knife cassette relative to the insulated conductor that is to be stripped.

According to still another object of the invention, each knife cassette comprises an integral one-piece unit including a pair of side walls that are connected with each other via a hinge and that receive therebetween in clamping relation the insulation stripping knife. Such a knife cassette has a relatively simple structure and therefore can be made at very low cost. If it is made of a synthetic plastic material, then the hinge can be a flexible planar hinge, which further simplifies the production of the knife cassette. For example, the synthetic plastic cassette body can be a molded part or an extruded part.

According to another object of the invention, the side walls of the cassette have forward recesses to expose the cutting edge of the insulation stripping knife by sectors. The insulation stripping knife thus is mounted within the knife cassette so that a secure hold is ensured. Moreover, this also reduces the danger of injury to a user if he wants to insert a knife cassette into the clamping body, because the insulation knife essentially is enclosed by the side walls of the knife cassette. Also, according to another feature, the opposed ends of the foldable side walls of the cassette are provided with guide tables that cooperate with grooves defined in the corresponding walls of the cassette-receiving opening in the clamping member, thereby to maintain the cassette side walls together as well as to position the cassette longitudinally of the axis of the stripping channel.

According to a more specific object of the invention, the insulation stripping knife is connected for pivotal adjustment about a pivot pin, adjustment means being provided within the cassette to set the angular position of the insulation stripping knife. The setting means includes a block connected for sliding non-rotatable displacement between the foldable cassette side walls, the block containing a threaded bore through which a threaded rod is screwed. Depending on the axial position of the threaded rod, a correspondingly different angular position of the insulation stripping knife is then assumed, and the knife can be pivoted around the pivot pin by means of the threaded rod. To prevent the insulation stripping knife from pivoting too far around the pivot pin and thus projecting too far out of the knife cassette, there is provided in the insulation stripping knife a longitudinal hole that extends in the pivoting direction and through which protrudes a segment pin that is firmly connected with one of the side walls of the knife cassette. The pin and the longitudinal hole define a stop for limiting the pivotal motion of the insulation stripping knife.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
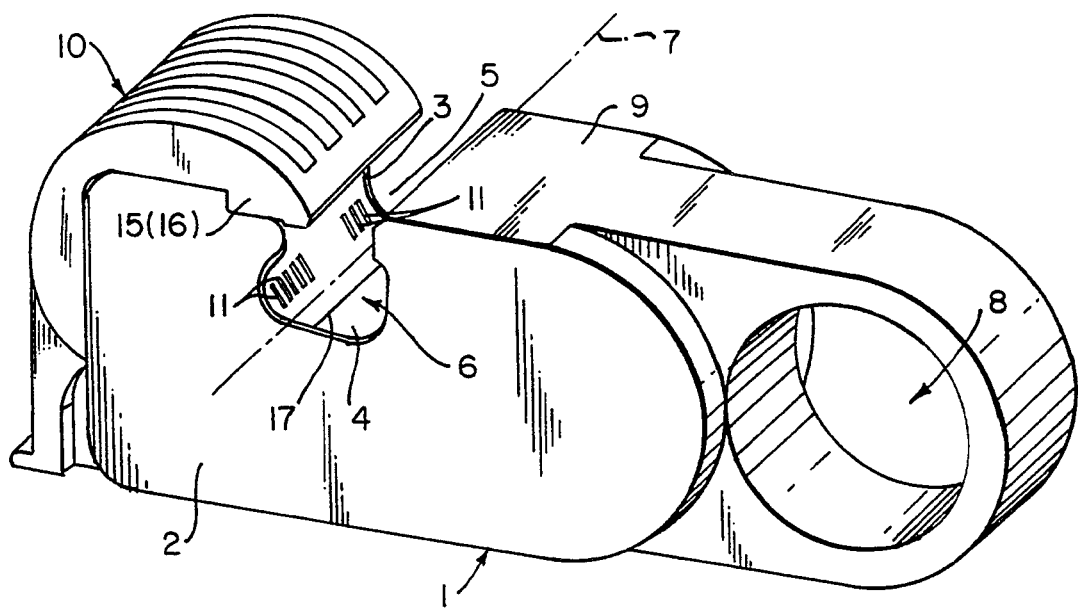
FIG. 1 is a perspective view of the stripping tool of the present invention, with certain parts removed.
Figure 2:
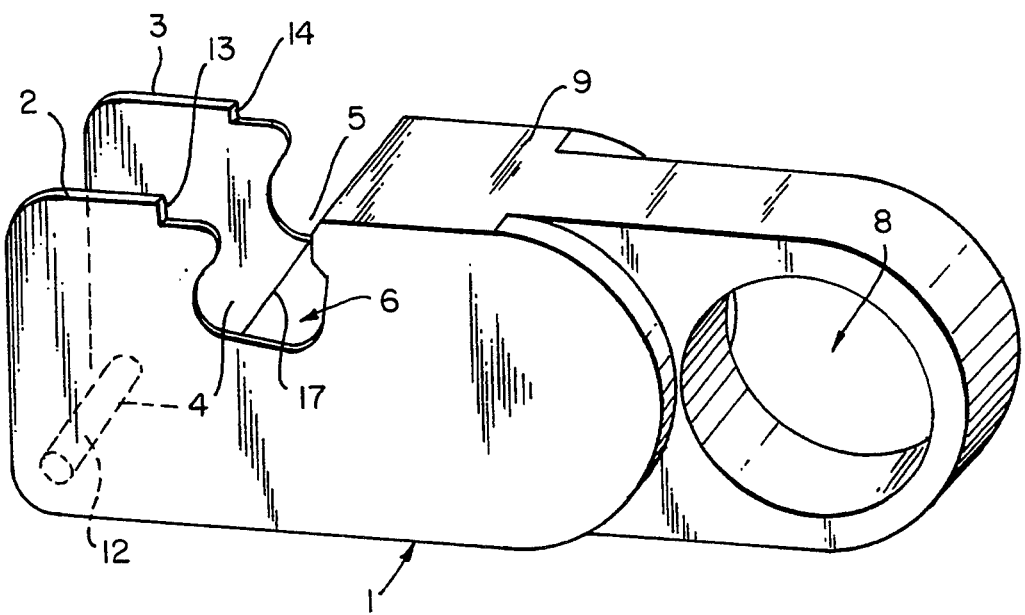
FIG. 2 is a perspective view of the tool housing of FIG. 1.
Figure 3:
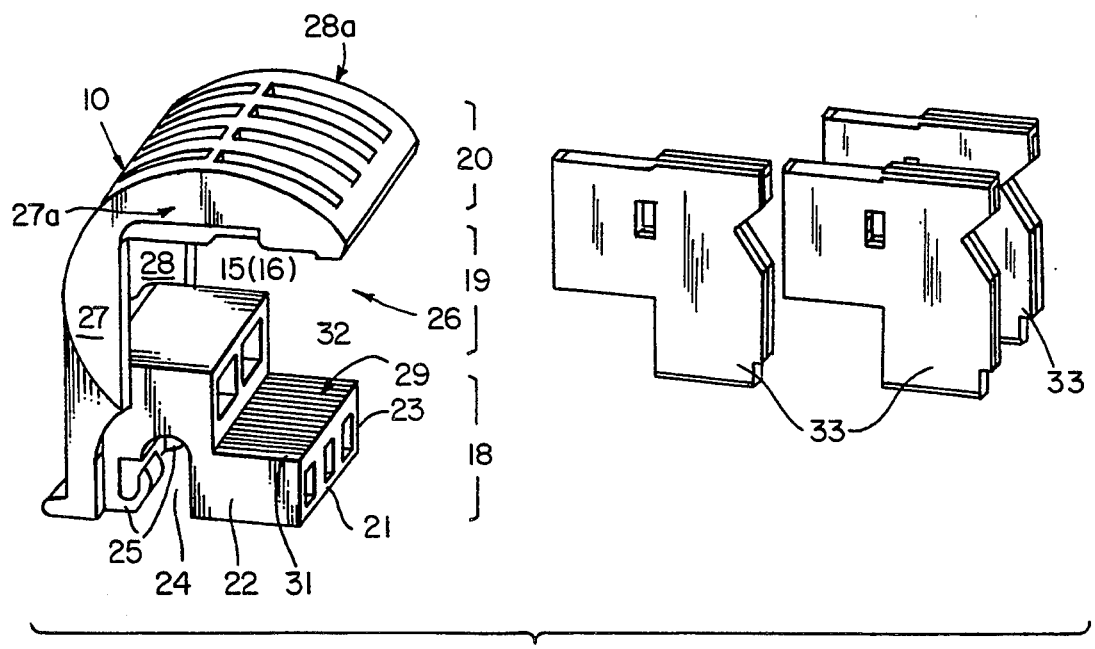
FIG. 3 is an exploded perspective view of the knife cassette support body assembly of FIG. 1.
Figure 4:
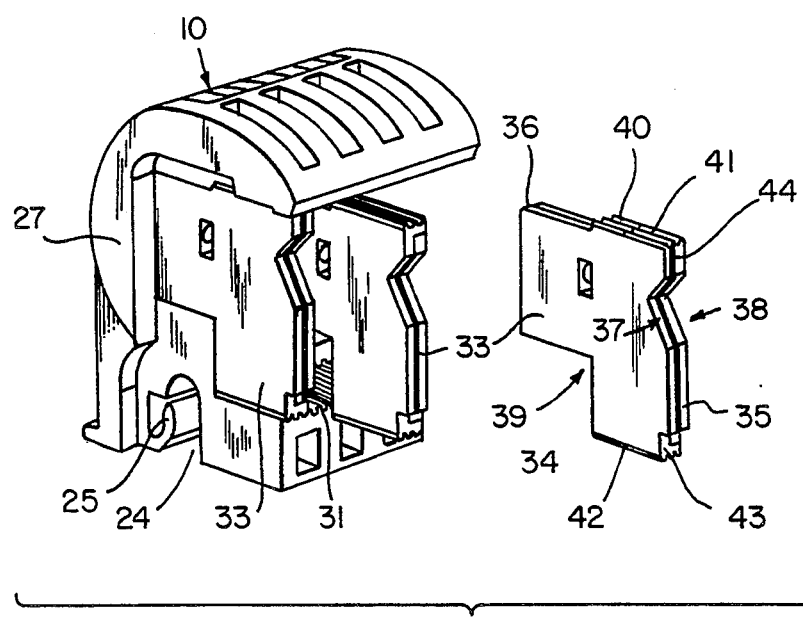
FIGS. 4 and 5 are exploded and perspective views, respectively, illustrating the manner of mounting a plurality of knife cassettes within the support member.
Figure 5:
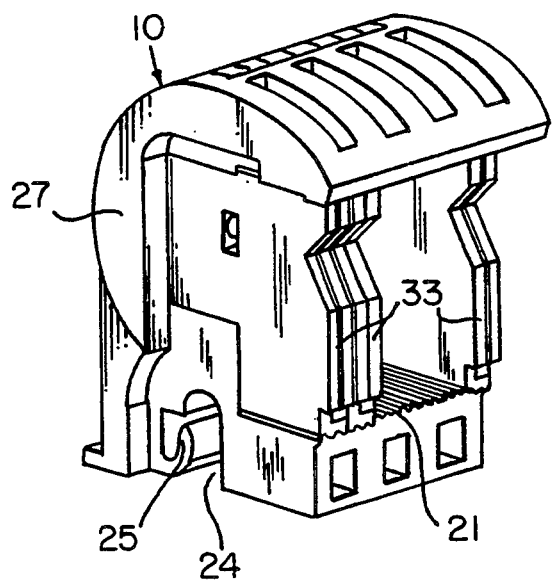

Referring first more particularly to FIGS. 1 and 2, the insulation stripping tool of the present invention includes a hollow tool housing 1 having at one end a pair of spaced side walls 2 and 3 containing recesses 4 and 5 for defining an insulation-stripping channel 6 for laterally receiving an insulated conductor having a longitudinal axis 7. At its other end, the tool has a finger opening 8 for receiving the finger of the user during use, or for receiving an auxiliary clamping tool, or the like. The housing also includes a horizontal upper wall 9, and a lower cross beam 17 that strengthens the side walls 2 and 3. Mounted between the side walls 2 and 3 is a knife cassette supporting body 10 that is adapted to support a plurality of knife cassettes having exposed parallel insulation slitting blades 11. A transverse shaft 12 extending between the lower edges of the side walls 2 and 3 serves to connect the knife-cassette-supporting first clamping body 10 with the tool housing 1. More particularly, as shown in FIGS. 3–5, the knife cassette support body 10 contains a lateral cassette-receiving opening or groove 26 that communicates with the stripping channel 6 contained in the tool housing 1, thereby defining on the body a base portion 18, an intermediate portion 19, and a top portion 20. The base portion 18 has a bottom wall 21, a top wall carrying the lower cassette guide means 29, and a pair of side walls 22 and 23, the bottom wall containing a recess 24 for receiving the transverse shaft 12 of FIG. 2, a pair of hook projections 25 being provided behind which the shaft 12 is retained, thereby to removably connect the knife cassette supporting body to the tool housing 1. Shoulders 15 and 16 at opposite ends of the support member cooperate with corresponding ribs 13 and 14 on the tool housing, thereby to lock the support body 10 in place on the housing 1.

The intermediate portion of the support member includes a pair of vertical spaced side wall columns 27 and 28 each having a thickness which corresponds with that of the side walls 2 and 3 of the tool housing 1. The top portion 20 of the support member 10 includes horizontal upper guide means 30 arranged on the upper vertical side wall column portions 27a, 28a above the lower guide means 29 contained on the base portion 18. More particularly, these upper and lower guide means include ribs 31 that define guide grooves which serve to guide and support the knife cassettes 33. The lower edge of each cassette includes guide ribs 42 and 43 for engaging grooves defined by the ribs 31 on the base portion 18 of the support member 10, and the upper edge of the cassettes having guide ribs 40 and 41 adapted for insertion within the corresponding grooves provided in the upper guide means 30. As will be described in greater detail below, each of the knife cassettes 33 includes a pair of side walls 34 and 35 that are joined by a flexible planar hinge 36, and include cooperating rib and groove means 44.

Figure 6:
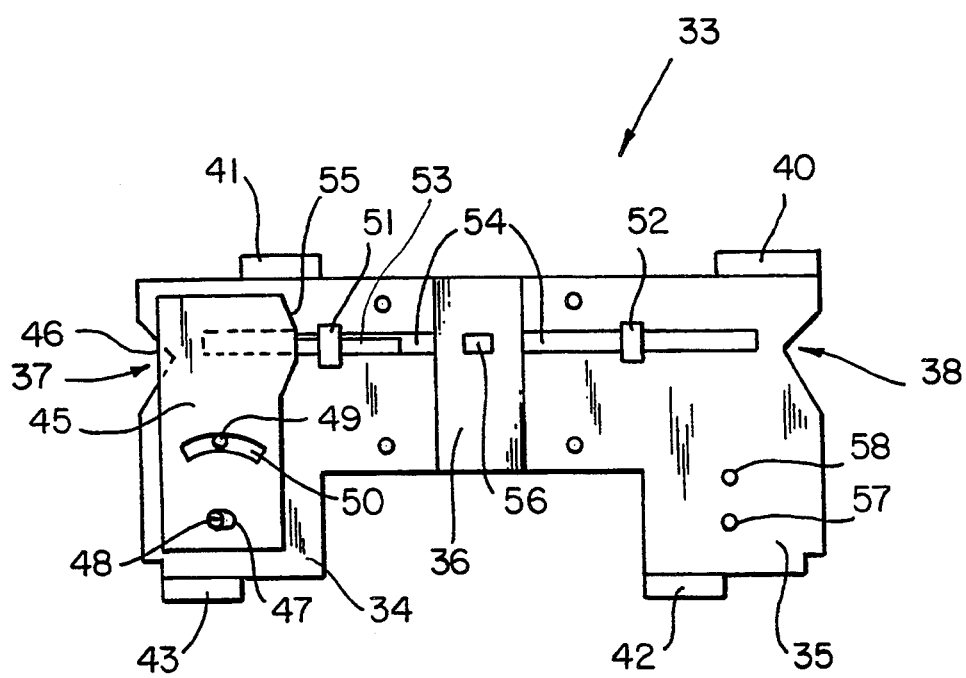
FIG. 6 is an elevational view illustrating a knife cassette in the open position.

Referring now more particularly to FIG. 6, the knife cassette 33, as shown in its unfolded flat open condition, is adapted to contain an insulation stripping knife 45 having a forward cutting edge 46 that extends within the recesses 37 and 38 contained in the edge portions of the cassette side walls remote from the planar hinge 36. The insulation-striping knife or blade 45 is pivotally connected with the side wall 34 for movement about the pivot pin 48 on the side wall 34 that extends through an opening 47 contained in the knife and terminates in a corresponding opening 57 contained in the cassette side wall 35. Similarly, in order to limit the extent of pivotal movement of the knife relative to the cassette, a stop pin 49 on the side wall 34 extends through slot 50 contained in the knife and terminates in a corresponding opening 58 contained within the second cassette side wall 35. An adjustment block 51 contains a threaded bore in which is threadably mounted a threaded adjustment rod 53 that is slidably moveable within guide grooves 54 contained in the cassette side walls 34 and 35. An access opening 56 contained in the planar flexible hinge portion 36 affords access to a non-circular screw-driver-receiving recess contained in the right hand end of the threaded rod 53. Thus, in order to angularly adjust the position of the stripping knife 45 to control the depth of exposure of the knife edge 46, a screwdriver is inserted through the opening defined between the vertical columns 27 and 28 and through the access opening 56 in the hinge 32 to engage the slot contained in the adjacent end of the threaded rod 53, whereby upon rotation of the threaded rod, the left hand end thereof engages the adjacent convex edge 55 of the stripping knife 45 and thereby angularly displaces the stripping knife about the pivot pin 48. Opposed recess 52 contained in the cassette side walls receive the adjustment block to prevent the same from rotating relative to the cassette walls.

Referring again to FIGS. 4 and 5, it is important to note that the thickness of each cassette 33 is appreciably less than the length of the opening 26 contained in the support member 10, as well as the length of the insulation stripping channel 6 defined in the tool housing 1. Thus, a single cassette 33 may be adjusted to any desired position by appropriate insertion of the guide ribs 40, 41 and 42, 43 within the corresponding grooves defined within the upper and lower guide means 30 and 29, respectively. Also, in the case of a coaxial cable including a plurality of concentrically arranged layers, cutting of the insulation at various longitudinally spaced portions on the conductor may be achieved by appropriate insertion of the tabs on the cassettes with corresponding grooves contained within the upper and lower guide means 30 and 29, respectively. Thus, as shown in FIG. 5, a pair of the cassettes may be longitudinally spaced from a third cassette, and the depths of the cuts produced by the associated knife blades 45 may be controlled by appropriate adjustment of the corresponding adjustment rods 53 by screwdriver means extending through the corresponding adjustment openings 56 contained in the flexible hinge portions of the knife cassettes. Preferably, the knife cassettes are formed from a suitable synthetic plastic material as an integral structure, the planar hinge portion 36 of the assembly being flexible.

During insertion of the knife cassettes within the opening 26 contained in the support member 10, the guide ribs 40, 41 and 42, 43 are guided by the corresponding grooves contained in the upper and lower guide means 30 and 29 until the vertical wall defined by the cut-out portion 39 engages the stop block portion 32 of the support member 10. The cooperation between the guide ribs and the grooves thus maintain the knife cassettes in the folded condition. Owing to the opening defined between the spaced vertical columns 27 and 28, a screwdriver may be easily applied to each of the cassettes to control the degree of exposure of the corresponding stripping knife 45, and thus the depth of the cut achieved in the insulated conductor.

In operation, the insulated conductor is inserted within the stripping channel 6, whereupon clamping means (not shown) bias the conductor to the left toward engagement with the cutting edges of the various cassettes supported by the supporting body 10. The details of the biasing means for clamping the insulated conductor toward the knife edges is shown in detail in the aforementioned European patent No. EP 0206376B1, and thus will not be repeated here. If desired, further stop means may be provided at the upper portion of the cassette opening 26 to support the upper portion of the cassette. With the insulated conductor biased to the left toward engagement with the cutting edges 46 of the cassette knives 45, the tool is then manually rotated about the conductor to slit the insulation to the desired depths corresponding with the degree of exposure of the cutting knives 45, whereupon the insulation is then removed from the cable. While the tool has been disclosed as being particularly suitable for cutting and stripping insulated electrical conductors, it will be apparent that the stripping tool has utility in severing layers from other structures, such as hoses, coated pipes, or the like.

While in accordance with the Patent Statutes the preferred forms and embodiments have been illustrated and described, it will be apparent that various changes may be made without deviating from the inventive concepts set forth above.

What is claimed is:

1. An insulation stripping tool for stripping the insulation from an insulated electrical conductor, comprising:
   (a) a tool housing (1) having a first side wall containing a stripping channel (4) for laterally receiving an insulated conductor (7);
   (b) at least one knife cassette (33) having an insulation-stripping knife (45); and
   (c) means supporting said knife cassette on said tool housing for displacement between a plurality of insulation-cutting positions longitudinally of said stripping channel, said supporting means including:
      (1) a support member (10) connected with said tool housing and containing a cassette-receiving opening (26), said knife cassette being adapted for insertion within said cassette-receiving opening with an orientation normal to the axis (7) of said stripping channel, the thickness of said knife cassette being less than the length of said cassette-receiving opening; and
      (2) a plurality of retaining means (29, 30) contained within said cassette-receiving opening for retaining said knife cassette at one of a plurality of insulation cutting positions longitudinally spaced of said cassette-receiving opening, said retaining means including lower and upper guide means (29, 30) contained on opposite walls of said opening, each of said guide means comprising a plurality of parallel spaced coplanar ribs (31) which define therebetween a plurality of grooves extending normal to the axis of said stripping channel; and further wherein said knife cassette includes at opposite ends guide tabs (40, 41; 42, 43) adapted for sliding insertion within said grooves in accordance with the longitudinal position of said cassette relative to said opening.

2. A stripping tool as defined in claim 1, wherein a plurality of said knife cassettes (33) are arranged in parallel spaced relation in said cassette-receiving opening in said support member.

3. A stripping tool as defined in claim 2, wherein each of said knife cassettes contains a single stripping knife (45).

4. A stripping tool as defined in claim 1, wherein said cassette-receiving opening (26) faces said stripping channel (4).

5. A stripping tool as defined in claim 1, wherein said knife cassette (33) comprises:
   (1) a pair of planar side walls (34, 35);
   (2) hinge means (36) connecting a first pair of corresponding edges of said side walls, thereby to permit displacement of said walls between a closed condition in which said side walls are contiguous, and an open condition;

(3) said insulation stripping knife (45) being supported between said side walls when said side walls are in said closed condition.

6. A stripping tool as defined in claim 5, wherein said cassette side walls and hinge means are formed as an integral body from a synthetic plastic material, said hinge means comprising a flexible planar layer.

7. A stripping tool as defined in claim 6, wherein said cassette walls include a second pair of edges remote from said first pair of edges, said second pair of edges containing opposed cassette recesses (37, 38) through which said insulation stripping knife is exposed.

8. A stripping tool as defined in claim 7, wherein said cassette side walls each includes a pair of parallel third edges normal to said first and second edges, said guide tabs (40, 41; 42, 43) being carried by each of said third edges, the corresponding guide tabs of said cassette side walls being in parallel spaced relation when said cassette is in the closed condition.

9. A stripping tool as defined in claim 7, and further including means (48) supporting said knife for pivotal movement about a pivot axis normal to said cassette side walls when said cassette is in the closed condition, and adjustment means (53) for pivoting said knife between positions having a different degree of cutting exposure relative to said cassette recesses.

10. A stripping tool as defined in claim 9, and further including stop means for limiting the extent of angular displacement of said knife relative to said cassette recesses, said stop means comprising a stop pin (49) carried by one of said cassette side walls and extending orthogonally therefrom toward the other side wall, said knife containing a slot (50) receiving said stop pin.

11. A stripping as defined in claim 9, wherein said adjustment means comprises an adjustment block (51) mounted in stationary relation between said cassette side walls when said cassette is in the closed condition, and a threaded adjustment rod (53) extending normal to the hinge axis of said hinge means, said rod being threadably mounted in a threaded bore contained in said adjustment block, one end of said rod being in abutting engagement with one edge portion (55) of said knife.

12. A stripping tool as defined in claim 11, wherein said hinge means contains an access opening (56) opposite said rod, said rod having a second end adjacent said access opening, said rod second end containing a non-circular recess for engagement by screwdriver adjustment means.

13. A stripping tool as defined in claim 12, wherein said cassette support member contains an access opening opposite said cassette when said cassette is inserted hinge-end in first in said cassette-receiving opening, thereby to permit adjustment of a knife relative to its cassette when said cassette is mounted in said cassette-receiving opening.

* * * * *